United States Patent Office 3,421,776
Patented Jan. 14, 1969

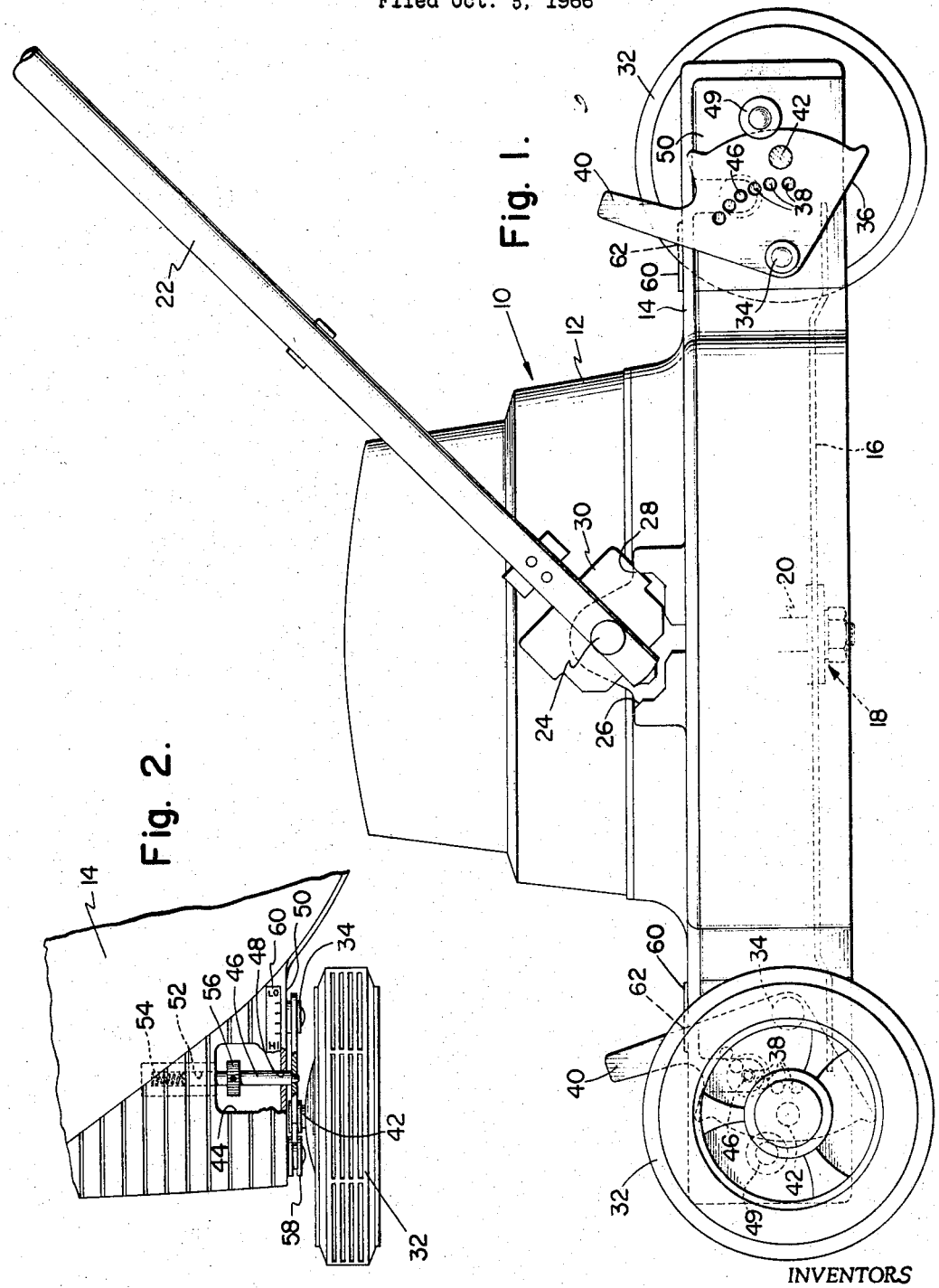

3,421,776
LAWNMOWER HEIGHT ADJUSTMENT APPARATUS
Donald P. McCoy, Easley, and Charles J. Stockburger, Pickens, S.C., assignors to The Singer Company, New York, N.Y., a corporation of New Jersey
Filed Oct. 5, 1966, Ser. No. 584,513
U.S. Cl. 280—43.17                            1 Claim
Int. Cl. B62b 3/02; B62b 5/00; A01d 35/26

ABSTRACT OF THE DISCLOSURE

Height adjustment apparatus for a lawnmower is described. The mower has a blade shroud, a horizontal face of such shroud being provided with an opening exposing a generally horizontally disposed spring loaded pin that projects through a generally vertical wall of the shroud to engage selectively one of several apertures in a bell crank pivotally supported by and on the outside of the shroud. By reaching through the shroud opening to release the pin, blade height may be set as desired by positioning the bell crank about its pivotal axis, and thereafter returning the pin to a new aperture in the crank.

---

This invention relates in general to lawnmowers, and in particular provides improved apparatus for adjusting the cutting height of the blades of a lawnmower.

Typical of prior art apparatus for adjusting lawnmower blade cutting height is the apparatus of United States Patent No. 3,147,987, which apparatus includes an axle supporting bell crank that is relatively positionable with respect to a locking plate, and includes sundry other parts for mounting and locking purposes.

Aside from improving esthetically on the design of the apparatus disclosed in the abovementioned patent, the present invention provides a sturdier, easier-to-use, construction, though of far fewer parts, and such is made possible by utilizing to full advantage the frame of the mower itself, in particular the blade shroud, as a mounting support for a locking pin adapted for cooperation with an axle supporting bell crank.

In its preferred form, a generally horizontal face of the shroud is provided (for each wheel of the mower) with an opening exposing a generally horizontally disposed spring loaded pin that projects through a generally vertical wall of the shroud to engage selectively one of several apertures in a bell crank pivotally supported by and on the outside of the shroud. By reaching through the shroud opening to release the pin, blade height may be set as desired by positioning the bell crank about its pivotal axis, and thereafter returning the pin to a new aperture in the crank.

As for its easy-to-use quality, with apparatus embodying the invention, the bell crank need only be rotated about a single fixed axis for setting purposes, whereas with apparatus as disclosed, say, in the abovementioned patent, the axis of the bell crank must be shifted prior to each rotation of the crank.

As for its sturdiness, with apparatus according to the invention, the locking pin gets housed within and supported by the rigid frame of the mower, whereas this is not the case with the known prior art.

A principal object of the invention is to provide improved apparatus for adjusting the cutting height of the blades of a lawnmower.

Another object is to provide a wheel supported lawnmower that is adjustable for various cutting heights, and wherein the mower, for each of its wheels, includes therefor a locking pin and a pivotable axle supporting bell crank, both said pin and said crank being individually separately supported by the frame of the mower.

The invention will be described with reference to the figures within.

FIG. 1 is a side elevational view of a rotary lawnmower embodying the cutting height adjustment feature of the invention, and FIG. 2 is a vertical projection taken from FIG. 1, and is a plan view, partially in section, illustrating an adjustable wheel support as employed by the mower of FIG. 1.

Referring to the figures, a rotary lawnmower 10 has a housing frame 12 designed to mount therein a drive motor (not shown). The mower is further provided with a shroud 14 adapted to shield an operator from the high speed rotary action of a blade 16 secured by means of a nut and clamp assembly 18 to the motor drive shaft 20. The mower includes a handle 22 pivotally supported at 24 by the shroud 14, and to allow the mower to be pushed from either direction, the handle 22 may be set to either of two rest positions. These positions are defined by the surfaces 26, 28 against which a plate 30 on the handle 22 may abut.

At each of the four corners of the mower 10, wheels 32 are mounted in a manner according to the invention. FIG. 1 shows one wheel removed from the mower 10 to illustrate better the details of the wheel mount construction; and since the wheels 32 are all identically supported, the description below is directed to only one such wheel mount. A stud 34, rigidly secured to and projecting horizontally from the shroud 14, pivotally supports a lever in the nature of a bell crank 36 for movement thereof about the axis of the stud 34. The crank 36 is provided with an arcuate array of apertures 38 arranged generally concentrically about the pivotal axis of the crank 36; and the crank 36 is also adapted to include a handle 40 for use in positioning the crank.

A stud-like axle 42 secures to the bell crank 36 at a distance from the pivotal axis of the crank, i.e. the stud 34, and the axle 42 supports the wheel 32 for rotation thereof.

An opening 44 is provided (for each wheel 32) in the top face of the shroud 14, and such opening exposes a locking pin 46. One end of the pin 46 extends through an aperture 48 in the generally vertical wall 50 of the shroud 14, and the other end of the pin 46 is supported within a sleeve-like housing 52. A compression spring 54, contained within the housing 52, urges the pin 46 axially through the shroud aperture 48 for selective engagement with one of the arrayed apertures 38. A collar 56 is secured to the pin 46 by means of a set screw, and serves not only to facilitate manual disengagement of the pin 46 from one of its apertures 38, but also serves to prevent the pin 46 from slipping out of the aperture 48 in the shroud 14 by limiting its axial movement.

To assure easy positioning of the bell crank 36 and to steady it on its pivot stud 34, a rotary grooved wheel 49 is supported on the shroud 14, and engages the peripheral part of the crank. A scale 60, showing indicia representing the cutting height of the mower 10, is provided on the top face of the shroud 14 adjacent to the opening 44, the edge 62 of the handle 40 serving as a marker to indicate at a glance the precise cutting height that is set into the mower. In other words, some part of the edge 62 of the handle 40 may selectively be placed in horizontal alignment with the scale 60, and wherever the scale 60 and handle edge 62 are positionally in coincidence is a reflection of the cutting height to which the mower is set.

To set, for example, the mower 10 for high cutting action, the operator reaches through the opening 44, grasps the collar 56 and retracts the pin 46 from the crank 36 against the action of the compression spring 54. With the pin still disengaged from the crank, the crank handle 40 is positioned so that its edge 62 aligns with the HI index mark (i.e. the left hand crank 36 of FIG. 1 is turned counterclockwise), following which the pin 46 is released to re-engage the crank, but this time in a different aperture 38. To set the mower for cutting at lower heights, the bell crank 36 is similarly positioned, but in accordance with the cutting height desired.

While the invention has been described in its preferred form, it is to be understood that the words which have been used are words of description rather than of limitation, and that changes within the purview of the appended claim may be made without departing from the true scope and spirit of the invention.

Having thus set forth the nature of this invention, what is claimed herein is:

1. A lawnmower having a blade, a supporting frame adapted to support said blade for rotation in a substantially horizontal plane, and means for supporting said frame at selectable heights relative to the ground, lever means pivotally supported at a fixed point on said frame, said lever means being adapted to be pivotally positionable in a substantially vertical plane, locking means supported by and relatively movable with respect to said frame and engageable with said lever means for holding said lever means in a selected position of adjustment, and said means for supporting said frame being secured to and supported by said lever means, said blade supporting frame having an opening therein, said locking means being a spring-loaded pin exposed by said opening and projecting from said frame, and said lever means being a bell crank provided with an array of apertures arranged for selective engagement with said pin, said apparatus further including means on said pin for engagement thereof to release said pin from said apertures in said bell crank, and a compression spring, said frame having a sleeve-like receptacle therein for fully containing said compression spring and for partially containing said pin and said apparatus including a guide wheel having a peripheral edge which is provided with a groove thereon, and means for rotationally supporting said guide wheel directly on said frame, the bell crank of said apparatus being also pivotally supported directly on said frame, and said bell crank being provided with an edge thereof that is adapted to ride in the groove of said guide wheel, the means for supporting said frame being a wheel rotationally supported by said bell crank at a point thereof which is off the pivotal axis of said crank.

References Cited

UNITED STATES PATENTS

| | | | |
|---|---|---|---|
| 91,963 | 6/1869 | Perry | 172—395 |
| 561,227 | 6/1896 | Hopkins | 172—395 X |
| 2,296,789 | 9/1942 | Johnson | 280—150.5 |
| 2,836,430 | 5/1958 | Lagenbacher | 280—43 |
| 2,878,731 | 3/1959 | Kressin | 280—43 X |
| 2,915,318 | 12/1959 | Chesser | 280—43 |
| 3,147,987 | 9/1964 | Ritums | 280—43.17 X |

BENJAMIN HERSH, *Primary Examiner.*

R. SONG, *Assistant Examiner.*